United States Patent
Roth et al.

(10) Patent No.: US 12,351,667 B2
(45) Date of Patent: *Jul. 8, 2025

(54) SEPARATOR FOR ELECTROCHEMICAL ENERGY ACCUMULATORS AND CONVERTERS

(71) Applicant: Carl Freudenberg KG, Weinheim (DE)

(72) Inventors: Michael Roth, Mainz (DE); Iain Smith, Dursley (GB); Christian Waschinski, Heidelberg (DE); Sandra Falusi, Viernheim (DE); Marco Sutter, Weinheim (DE)

(73) Assignee: CARL FREUDENBERG KG, Weinheim (DE)

( * ) Notice: Subject to any disclaimer, the term of this patent is extended or adjusted under 35 U.S.C. 154(b) by 979 days.

This patent is subject to a terminal disclaimer.

(21) Appl. No.: 17/312,953

(22) PCT Filed: Dec. 6, 2019

(86) PCT No.: PCT/EP2019/083964
§ 371 (c)(1),
(2) Date: Jun. 11, 2021

(87) PCT Pub. No.: WO2020/120310
PCT Pub. Date: Jun. 18, 2020

(65) Prior Publication Data
US 2022/0056186 A1 Feb. 24, 2022

(30) Foreign Application Priority Data
Dec. 12, 2018 (DE) .............. 10 2018 131 928.2

(51) Int. Cl.
| | |
|---|---|
| *C08F 290/06* | (2006.01) |
| *C25B 13/08* | (2006.01) |
| *H01G 11/52* | (2013.01) |
| *H01G 11/84* | (2013.01) |
| *H01M 8/0239* | (2016.01) |
| *H01M 8/10* | (2016.01) |
| *H01M 8/1023* | (2016.01) |
| *H01M 8/18* | (2006.01) |
| *H01M 50/403* | (2021.01) |
| *H01M 50/414* | (2021.01) |
| *H01M 50/417* | (2021.01) |
| *H01M 50/42* | (2021.01) |
| *H01M 50/44* | (2021.01) |
| *H01M 50/489* | (2021.01) |

(52) U.S. Cl.
CPC .......... *C08F 290/062* (2013.01); *C25B 13/08* (2013.01); *H01G 11/52* (2013.01); *H01G 11/84* (2013.01); *H01M 8/0239* (2013.01); *H01M 8/1023* (2013.01); *H01M 8/18* (2013.01); *H01M 50/403* (2021.01); *H01M 50/414* (2021.01); *H01M 50/417* (2021.01); *H01M 50/42* (2021.01); *H01M 50/44* (2021.01); *H01M 50/489* (2021.01); *C08F 2810/20* (2013.01); *H01M 2008/1095* (2013.01)

(58) Field of Classification Search
CPC .... H01M 8/0239; H01M 8/1023; H01M 8/18; H01M 50/403; H01M 50/414; H01M 50/417; H01M 50/42; H01M 50/44; H01M 50/489; H01M 2008/1095; H01M 10/0525; H01M 10/052; H01G 11/84; H01G 11/52; H01G 9/02; C08F 290/062; C08F 2810/20
See application file for complete search history.

(56) References Cited

U.S. PATENT DOCUMENTS

| | | | |
|---|---|---|---|
| 6,461,772 B1 | 10/2002 | Miyake | |
| 8,703,330 B2 | 4/2014 | Phillips | |
| 9,876,211 B2 | 1/2018 | Son | |
| 2002/0132169 A1 | 9/2002 | Yamamoto | |
| 2005/0175879 A1 | 8/2005 | Kiefer | |
| 2015/0207165 A1* | 7/2015 | Schubert | ............... H01M 8/188 429/105 |
| 2018/0040868 A1 | 2/2018 | Jang | |
| 2018/0062142 A1 | 3/2018 | Kong | |
| 2018/0069220 A1 | 3/2018 | Yuan | |
| 2018/0191026 A1 | 7/2018 | Thielen | |
| 2018/0198156 A1 | 7/2018 | Lee | |
| 2018/0337381 A1 | 11/2018 | Seo | |
| 2022/0059857 A1* | 2/2022 | Smith | ................. H01M 8/1004 |

FOREIGN PATENT DOCUMENTS

| | | | | |
|---|---|---|---|---|
| CN | 108341964 A | * | 7/2018 | ............. C08G 81/00 |
| DE | 10220817 A1 | | 11/2003 | |
| DE | 69908286 T2 | | 3/2004 | |

(Continued)

OTHER PUBLICATIONS

Machine Translation JP-2002231207 (Year: 2002).*
Machine Translation CN-108341964 (Year: 2018).*
Machine Translation WO2013060410 (Year: 2013).*
Machine Translation of JP2003051213 (Year: 2003).*
Machine Translation of WO2016098659 (Year: 2016).*
Machine Translation of WO2004020511 (Year: 2004).*

(Continued)

*Primary Examiner* — Jennifer A Steele
(74) *Attorney, Agent, or Firm* — LEYDIG, VOIT & MAYER, LTD.

(57) ABSTRACT

A separator for at least one of electrochemical energy accumulators or converters includes: a porous substrate with a comb polymer, the comb polymer containing a polymer main chain along several lateral chains that are covalently bonded to the polymer main chain. At least one of the lateral chains has at least one Lewis-acid or Lewis-base functionality.

17 Claims, No Drawings

(56) References Cited

FOREIGN PATENT DOCUMENTS

| JP | 2002231207 A | * | 8/2002 | |
|---|---|---|---|---|
| JP | 2003051213 A | * | 2/2003 | |
| WO | WO-2004020511 A1 | * | 3/2004 | ........... B01D 65/102 |
| WO | WO-2013060410 A1 | * | 5/2013 | ........ H01M 10/0525 |
| WO | WO-2016098659 A1 | * | 6/2016 | ............. B01D 71/56 |

OTHER PUBLICATIONS

Wu et al., "New Energy Materials Edition II", East China University of Science and Technology Press, Jul. 31, 2017, p. 79-83, East China University of Science and Technology, Shanghai, China.

Alexander Thaler et al., "Power Battery Technology For New Energy Vehicles", Beijing Institute of Technology Press, 2017, p. 71-73, Beijing Institute of Technology, Beijing, China.

Song Shili et al. "A new polysulfide blocker—poly(acrylic acid) modified separator for improved performance of lithium-sulfur battery", Journal of Membrane Science, May 2018, pp. 277-283, Elsevier BV, Netherlands.

Guopeng Fu et al. "Effect of Side-Chain Branching on Enhancement of Ionic Conductivity and Capacity Retention of a Solid Copolymer Electrolyte Membrane", Langmuir, Dec. 2017, pp. 13973-13981, American Chemical Society, Washington D.C., USA.

Kim Kw Ang Man et al. "Enhanced separator properties by thermal curing of poly(ethylene glycol)diacrylate-based gel polymer electrolytes for lithium-ion batteries", Electrochimica Acta, Dec. 2013, pp. 159-166, Elsevier, Netherlands.

* cited by examiner

SEPARATOR FOR ELECTROCHEMICAL ENERGY ACCUMULATORS AND CONVERTERS

CROSS-REFERENCE TO PRIOR APPLICATIONS

This application is a U.S. National Phase application under 35 U.S.C. § 371 of International Application No. PCT/EP2019/083964, filed on Dec. 6, 2019, and claims benefit to German Patent Application No. DE 10 2018 131 928.2, filed on Dec. 12, 2018. The International Application was published in German on Jun. 18, 2020 as WO 2020/120310 under PCT Article 21 (2).

FIELD

The present invention relates to separators for electrochemical energy accumulators and converters—in particular, separators for batteries, i.e., primary & secondary cells, capacitors, fuel cells, electrolyzers, and/or combinations thereof.

BACKGROUND

The aim of a separator in electrochemical energy accumulators and converters is to electrically separate the respective half-cells from one another. At the same time, it is to allow a high ion conductivity between the half-cells, in order to optimize the necessary charge equalization. In addition, the separator shall have a high mechanical strength and chemical stability against the electrolytes used. The separator therefore essentially determines the service life and efficiency of electrochemical energy accumulators and converters.

A disadvantage of separators known in practice is that, in these, it is often the case that the ion conductivity is not decoupled from the air permeability and thus from the pore structure of the separators. In order to ensure the required high degree of ion conductivity, known separators as a rule have a porous, continuous pore structure or air permeability of the separators. As a result, they do not allow any decoupling of the ion conductivity from the pore structure or the air permeability of the separators.

Since, at least in batteries, the pore sizes required for ion transport are, as a rule, substantially larger in known separators than the ion radii of the ions to be transported (e.g., Li-cation in Li-ion, Li—S, or Li-metal batteries), no ion-selective transport of substances through the separator can thereby take place. Moreover, in the case of a pore-induced transport mechanism, undesired mass transfer of, for example, gases, electrode particles or degradation products, ionic compounds, and dendrites cannot be reliably prevented.

US20180069220 A1 describes a composite separator for use in Li-ion batteries. The composite separator consists of a microporous polyolefin membrane, which is coated with a porous coating made of inorganic particles and an organic binding agent. In this case, the particles and the binders are matched to one another by their surface energy, such that better adhesion of the coating to the PO membrane is achieved. Ion transport with this separator is essentially enabled by the pore structure of the separator, such that there is no decoupling of conductivity and air permeability or porosity.

US20180198156 A1 describes a separator for use in Li-sulfur batteries, which is coated with polydopamine and a conductive material. The coating is intended to prevent the polysulfide shuttle, among other things, by means of the polydopamine. Here as well, due to the ion transport caused by the pore structure, there is no decoupling of ion conductivity and pore structure. In addition, the polydopamine of lithium can be reduced, which equates to self-discharge of the battery.

US20180040868 A1 describes a separator consisting of a porous substrate with a porous coating for use in Li-ion batteries. In order to increase the adhesion of the porous coating to the porous substrate, an emulsion binder layer is applied between the porous substrate and the porous coating. Ion transport with this separator is essentially defined by the pore structure of the separator, such that there is likewise no decoupling of ion conductivity and air permeability or porosity.

US20180062142 A1 describes a separator for use in Li-sulfur batteries, which is coated with a functional layer. The functional layer consists of at least 2 carbon nanotube layers and at least 2 graphene oxide layers, which contain manganese dioxide particles. This functional layer is intended to increase the service life of the battery according to the invention. Ion transport with this separator is essentially enabled by the pore structure of the separator, such that there is also no decoupling of conductivity and air permeability or porosity.

U.S. Pat. No. 9,876,211 describes a multilayer battery separator for application in lithium-sulfur batteries and its use in lithium-sulfur batteries, which is intended to prevent the sulfur shuttle. The first layer consists of an ion-conducting, linear polymer, the second layer consists of inorganic particles with an organic binder, and, optionally, a third layer can consist of a porous substrate. Ion transport with this separator is essentially enabled by the pore structure of the separator, such that there is no decoupling of conductivity and air permeability or porosity.

U.S. Pat. No. 8,703,330 describes a cylindrical nickel-zinc battery containing a multilayer battery separator for electrically separating the electrodes from one another. The multilayer separator consists of a microporous barrier layer and a porous wetting layer. Thereby, the microporous barrier layer in the separator is to prevent zinc dendrite formation, and the wetting layer is to simultaneously allow good wetting of the separator. Specifically, the barrier layer typically consists of a microporous PO membrane, which is very poorly wetted by aqueous electrolytes. Such poor wetting leads to an increased internal resistance of the battery, which reduces the service life of the battery. Here as well, due to the ion transport caused by the pore structure, there is no decoupling of ion conductivity and pore structure. Therefore, a complete suppression of dendrite formation cannot be ensured. Only a short circuit caused by dendrites is delayed in time, since a separator thicker in the Z-direction is used. In addition, a multilayer separator structure is associated with higher costs and difficult processing.

SUMMARY

In an embodiment, the present invention provides a separator for at least one of electrochemical energy accumulators or converters, comprising: a porous substrate with a comb polymer, the comb polymer containing a polymer main chain along several lateral chains that are covalently bonded to the polymer main chain, wherein at least one of the lateral chains has at least one Lewis-acid or Lewis-base functionality.

DETAILED DESCRIPTION

In an embodiment, the present invention provides a separator with a high ion conductivity for use in electrochemical energy accumulators and converters, with which the ion conductivity is decoupled from the air permeability and thus from the pore structure of the separators. Furthermore, it shall offer the possibility of preventing undesired mass passage—for example, of gases, dissolved or particulate substances. In addition, the separators are intended to have a low degree of ionic resistance despite their air impermeability, in order to provide efficient energy accumulators and converters.

In an embodiment, the present invention provides a separator for electrochemical energy accumulators and/or converters—in particular, separators for batteries, accumulators, capacitors, fuel cells, electrolyzers, and/or combinations thereof—wherein the separator contains a porous substrate with a comb polymer, wherein the comb polymer contains a polymer main chain along several lateral chains that are covalently bonded to the polymer main chain, and wherein at least one of the lateral chains has at least one Lewis-acid and/or Lewis-base functionality.

According to the invention, it has been found that the aforementioned separator makes it possible to decouple the ion conductivity of the separator from its air permeability and thus from its pore structure. Without being fixed upon a mechanism, it is presumed that this is made possible by the fact that, upon interaction with the electrolyte, the Lewis-acid and/or Lewis-base functionalities can generate an ion-conductive pathway. This mechanism thus allows the transport of the charge carriers through the separator, independently of porosity and pore size.

In addition, an undesired transport of substances can be prevented in the transport mechanism enabled by the separator according to the invention. Thus, by decoupling ion conduction and pore size, it is possible to prevent or at least reduce, by means of a targeted reduction in the pore size, the passage of particles (for example, electrode particles or degradation products), dendrites, and gases. In addition, the Lewis-acid and/or Lewis-base functionalities enable selective charge transport, whereby undesired ions can be prevented from passing through the separator.

In practical tests, it has also been found that the separator according to the invention combines a high degree of conductivity with a high degree of mechanical stability. In addition, the separator according to the invention can be produced in one layer and nevertheless meet all requirements imposed on it. This is advantageous in terms of production and costs.

The separator according to the invention is particularly suitable for batteries, capacitors, fuel cells, electrolyzers, and/or combinations thereof.

Preferred batteries are lithium-ion batteries, lithium-sulfur batteries, nickel-metal hydride batteries, nickel-cadmium batteries, nickel-iron batteries, nickel-zinc batteries, alkali-manganese batteries, lead-acid batteries, magnesium-ion batteries, sodium-ion batteries, zinc-air batteries, and lithium-air batteries.

Furthermore, redox flow batteries—in particular, vanadium redox flow batteries, vanadium-bromine redox flow batteries, iron-chromium redox flow batteries, zinc-bromine redox flow batteries, and organic redox flow batteries—are preferred.

Further preferred are capacitors—in particular, supercapacitors, double-layer capacitors, hybrid capacitors, and pseudo-capacitors.

Further preferred are fuel cells—in particular, LT polymer electrolyte fuel cells, HT polymer electrolyte fuel cells, alkaline fuel cells, direct methanol fuel cells, phosphoric acid fuel cells, and reversible fuel cells.

According to the invention, the separator has a porous substrate with a comb polymer.

Thereby, the comb polymer has a polymer main chain and several lateral chains covalently bonded to the polymer main chain, wherein at least one of the lateral chains has at least one Lewis-acid and/or Lewis-base functionality.

The advantage of using a comb polymer in comparison to linear polymers is that they have a lower tendency to crystallize. As a result, the comb polymers generally exhibit lower densities and thereby a high degree of lateral chain mobility. The high degree of lateral chain mobility in turn leads to a favoring in ion conductivity.

Another advantage of using a comb polymer is that it is possible to modify the chemical structure of the polymer backbone and the lateral chains independently of one another.

The term, "several lateral chains," is to be understood according to the invention as meaning that at least two repeat units of the main chain have at least one of the lateral chains according to the invention. The comb polymer preferably has 10 to 3,000, more preferably 50 to 2,000, and more preferably 100 to 2,000, of the lateral chains according to the invention. Preferably, at least 10%, e.g., 10% to 100%, preferably 20% to 100%, more preferably 50% to 100%, and in particular 75% to 100%, of the repeat units of the main chain have at least one-preferably one to two—of the lateral chains according to the invention.

The term, "polymer main chain," is understood according to the invention to mean the longest, covalently-bonded chain of atoms of a polymer. The polymer main chain preferably has a molecular weight of at least 580 g/mol, e.g., from 580 g/mol to 50,000 g/mol, preferably from 1,000 g/mol to 20,000 g/mol, and more preferably from 1,500 g/mol to 10,000 g/mol, and/or at least 8, e.g., 8 to 2,000, preferably 25 to 1,000, and in particular 25 to 500, repeat units.

In a preferred embodiment of the invention, the polymer main chain has on average at least 3, e.g., 3 to 2,000, preferably 10 to 1,000, more preferably 50 to 500, and in particular 50 to 250, lateral chains. Thereby, different main chains may have different numbers of lateral chains.

Preferably, the polymer main chain has polymerized monomers, wherein the monomers are selected from the group consisting of acrylates, methacrylates, acrylic acids, methacrylic acids, acrylamides, methacrylamides, vinylamides, vinylpyridines, N-vinylimidazoles, N-vinyl-2-methyl-imidazoles, vinyl halides, styrenes, 2-methylstyrenes, 4-methylstyrenes, 2-(n-butyl) styrenes, 4-(n-butyl) styrenes, 4-(n-decyl) styrenes, N,N-diallylamines, N,N-diallyl-N-alkylamines, vinyl- and allyl-substituted nitrogen heterocycles, vinyl ethers, vinylsulfonic acids, allylsulfonic acids, vinylphosphonic acids, styrene sulfonic acids, acrylonitriles and methacrylonitriles, and/or mixtures thereof.

Particularly preferred polymerized monomers for the polymer main chain are acrylic acids, methacrylic acids, acrylates, methacrylates, vinylsulfonic acids, vinylphosphonic acids, styrene sulfonic acids, styrene, and/or mixtures thereof.

The term, "lateral chain," is understood according to the invention to mean a polymer chain and/or oligomer chain which is covalently bonded to the polymer main chain and the chain length of which is shorter than that of the polymer main chain. Preferably, the lateral chain has a molecular weight of at least 220 g/mol, e.g., from 220 g/mol to 5,000 g/mol, preferably from 220 g/mol to 4,500 g/mol, preferably from 360 g/mol to 4,000 g/mol, more preferably from 450 g/mol to 2,500 g/mol, more preferably 600 g/mol to 2,500 g/mol, and in particular 700 g/mol to 2,500 g/mol, and/or at least 5 repeat units, e.g., 5 to 250, preferably 8 to 100, and in particular 8 to 50.

Preferably, the polymer lateral chain has polymerized monomers, wherein the monomers are selected from the group consisting of acrylates, methacrylates, acrylamides, methacrylamides, vinylamides, vinylpyridines, N-vinylimidazoles, N-vinyl-2-methylimidazoles, vinyl halides, styrenes, 2-methylstyrenes, 4-methylstyrenes, 2-(n-butyl) styrenes, 4-(n-butyl) styrenes, 4-(n-decyl) styrenes, N,N-diallylamines, N,N-diallyl-N-alkylamines, vinyl- and allyl-substituted nitrogen heterocycles, vinyl ethers, acrylonitriles and methacrylonitriles, acrylic acids, methacrylic acids, vinylsulfonic acids, allylsulfonic acids, vinylphosphonic acids, styrene sulfonic acids, and/or mixtures thereof.

Particularly preferred polymerized monomers for the polymer lateral chain are acrylic acids, methacrylic acids, acrylates, methacrylates, vinylsulfonic acids, vinylphosphonic acids, styrene sulfonic acids, and/or mixtures thereof.

In a preferred embodiment, the lateral chain is formed from polymerized macromonomers. The term, "formed," is understood to mean that the lateral chain is at least 95 wt %-preferably up to 100 wt %—of the macromonomer. A macromonomer is understood to mean oligomers or polymers which contain at least 1 polymerizable group. Macromonomers preferably have a molecular weight of at least 140 g/mol, e.g., from 140 g/mol to 10,000 g/mol, preferably from 220 g/mol to 5,000 g/mol, preferably from 360 g/mol to 2,000 g/mol, more preferably from 360 g/mol to 1,500 g/mol, more preferably 450 g/mol to 1,500 g/mol, and in particular 600 g/mol to 1,500 g/mol.

In this embodiment, in which at least one lateral chain is formed from polymerized macromonomers, the comb polymer preferably also has further monomers, e.g., acrylic acids, methacrylic acids, acrylates, methacrylates, vinylsulfonic acids, vinylphosphonic acids, styrene sulfonic acids, and/or mixtures thereof-preferably in a proportion of 0.5 wt % to 15 wt %, based upon the total weight of the comb polymer.

The comb polymer is preferably at least partially crosslinked. Crosslinking is to be understood according to the invention as the following types of crosslinking:
1. At least one polymer main chain of the comb polymer is covalently bonded to at least one other polymer main chain of the comb polymer; and/or
2. at least one polymer main chain of the comb polymer is covalently bonded to at least one lateral chain of the comb polymer; and/or
3. at least one lateral chain of the comb polymer is covalently bonded to at least one other lateral chain of the comb polymer; and/or
4. the aforementioned crosslinking types are in combination.

The crosslinking of the comb polymer can take place via conventional crosslinking methods known to the person skilled in the art, e.g., free-radical and/or ionic crosslinks, polymer-analogous crosslinks, coordinative crosslinks, and/or electrode-beam crosslinking.

The crosslinking of the comb polymer preferably takes place via crosslinking units polymerized into the polymer main chain and/or polymer lateral chain.

The polymerized crosslinking units can be obtained by copolymerizing bifunctional or polyfunctional monomers during production of the comb polymer.

Suitable bifunctional or polyfunctional monomers for free-radical polymerization are, in particular, compounds which can polymerize and/or crosslink at two or more locations in the molecule. Such compounds preferably have two identical or similar reactive functionalities. Alternatively, compounds having at least two, differently reactive functionalities can be used. Preferred bifunctional or polyfunctional monomers include, for example, diacrylates, dimethylacrylates, triacrylates, trimethacrylates, tetraacrylates, tetramethacrylates, pentaacrylates, pentamethacrylates, hexaacrylates, hexamethacrylates, diacrylamides, dimethacrylamides, triacrylamides, trimethacrylamides, tetraacrylamides, tetramethacrylamides, pentaacrylamides, pentamethacrylamides, hexaacrylamides, hexamethacrylamides, divinyl ethers, divinyl benzenes, 3,7-dimethyl-1,6-octadien-3-ol, and/or mixtures thereof.

Particularly preferred are 1,3-butanediol diacrylate, 1,6-hexanediol diacrylate, 1,9 nonanediol diacylate, neopentylglycol diacrylate, 1,6-hexanediol ethoxylate diacrylate, 1,6-hexanediol propoxylate diacrylate, 3-(acryloyloxy)-2-hydroxypropyl methacrylate, 3-hydroxy-2,2-dimethylpropyl 3-hydroxy-2,2-dimethyl propionate diacrylate, 5-ethyl-5-(hydroxymethyl)-β,β-dimethyl-1,3-dioxane-2-ethanol diacrylate, bisphenol-A-ethoxylated diacrylate with a molecular weight of approximately 450 g/mol to 700 g/mol, bisphenol-A-propoxylate diacrylate, di(ethylene glycol)-diacrylate, pentaerythritol-diacrylate monostearate, poly(ethylene glycol) diacrylate with a molecular weight of approximately 250 g/mol to 2,500 g/mol, poly(ethylene glycol) dimethacrylate with a molecular weight of approximately 250 g/mol to 2,500 g/mol, tetra(ethylene glycol) diacrylate, tri (propylene glycol) diacrylate, tri (propylene glycol)glycerolate diacrylate, trimethylolpropane benzoate diacrylate, vinyl crotonate, 1,3-divinylbenzene, 1,4-divinylbenzene, 1,6 bis(3,4-epoxy-4-methylcyclohexane carboxylic acid) hexyldiester, vinyl acrylate, vinyl methacrylate, di(trimethylolpropane)tetraacrylate, dipentaerythritol penta-/hexa-acrylate, pentaerythritol propoxylate triacrylate, pentaerythritol tetraacrylate, trimethylolpropane ethoxylate triacrylate with a molecular weight of 400 g/mol to 1,000 g/mol, N,N'-methylenebisacrylamide, poly(ethylene glycol) diacrylamides, tris [2-(acryloyloxy)ethyl]isocyanurate, 3,7-dimethyl-1,6-octadien-3-ol, and/or mixtures thereof.

In another preferred embodiment of the invention, the proportion of crosslinking units is 1 wt % to 75 wt %, more preferably 2 wt % to 55 wt %, more preferably 2 wt % to 45 wt %, and in particular 2 wt % to 25 wt %. The proportion of crosslinking units corresponds to the proportion of the bifunctional or polyfunctional monomers, based upon the total amount of monomers during production of the comb polymer.

In another preferred embodiment of the invention, the thickness of the separator according to the invention, measured according to test specification DIN EN ISO 9073-2, is from 10 µm to 2,000 µm, more preferably from 10 µm to 600 µm, more preferably from 14 µm to 300 µm, more preferably from 14 µm to 200 µm, and more preferably 14 µm to 150 µm.

In another preferred embodiment of the invention, the weight of the separator is from 6 g/m² to 400 g/m², more preferably from 8 g/m² to 250 g/m², more preferably from 10 g/m² to 150 g/m², and in particular from 10 g/m² to 100 g/m².

In another preferred embodiment, the Lewis-acid and/or Lewis-base functionalities are selected from primary, secondary, tertiary, and quaternary amino groups, imino, enamino, lactam, nitrate, nitrite, carboxyl, carboxylate ketyl, aldehyde, lactone, carbonate, sulfonyl, sulfonate, sulfide, sulfite, sulfate, sulfonamide, thioether, phosphonyl phosphonate, phosphate, phosphoric acid ester, ether, hydroxyl, hydroxide, halide, coordinately-bonded metal ion—in particular, transition metal ion, thiocyanate, and/or cyanide groups.

The Lewis-acid and/or Lewis-base functionalities are particularly preferably selected from primary, secondary, tertiary, and quaternary amino groups, lactam, lactone, ether, carboxyl, carboxylate, sulfonyl, sulfonate, phosphoric ester, phosphonyl, and/or phosphonate groups.

In another preferred embodiment of the invention, the conductivity of the separator according to the invention in 1 molar $LiPF_6$ in propylene carbonate is less than 200 mOhm*$cm^2$/μm, and particularly preferably 200 mOhm*$cm^2$/μm to 50 mOhm*$cm^2$/μm. In this embodiment, the separator preferably has Lewis-acid and/or Lewis-base functionalities, selected from lactone, ether, carboxyl, and/or sulfonate groups.

In another preferred embodiment of the invention, the electrical resistance of the separator according to the invention in 30% KOH is less than 0.3 Ohm*$cm^2$, and particularly preferably between 0.05 Ohm*$cm^2$ and 0.2 Ohm*$cm^2$. In this embodiment, the separator preferably comprises Lewis-acid and/or Lewis-base functionalities, selected from carboxyl, carboxylate, phosphonate, and/or sulfonate groups.

In another preferred embodiment of the invention, the air permeability of the separator according to the invention, measured according to EN ISO 9237 at 200 Pascals of air flow, is from 0 L/(s*$m^2$) to 400 L/(s*$m^2$), preferably from 0 L/(s*$m^2$) to 200 L (s*$m^2$), more preferably from 0 L/(s*$m^2$) to 100 L/(s*$m^2$), and more preferably from 0 L/(s*$m^2$) to 50 L/(s*$m^2$).

In a further preferred embodiment of the invention, the Gurley value of the separator according to the invention, measured according to ASTM D-726-58 with an air volume of 50 $cm^3$, is at least 500 s, and more preferably at least 750 s. The person skilled in the art knows that he can selectively affect the Gurley value by adjusting certain parameters, e.g., by fiber titer, thickness of the porous substrate, and/or amount of comb polymer. The setting of a high Gurley value of at least 500 s is advantageous, since the passage of particles (for example, electrode particles or degradation products), dendrites, and gases can thus be prevented or at least reduced by means of a targeted reduction of the pore size.

In another preferred embodiment of the invention, the electrolyte absorption of the membrane is 2 wt % to 600 wt %. More preferably, 10 wt % to 400 wt %, more preferably 10 wt % to 250 wt %, and in particular 25 wt % to 150 wt %.

In a further preferred embodiment of the invention, the separator according to the invention has a porosity of from 5% to 75%, more preferably from 15% to 65%, and in particular from 15% to 60%.

In a further preferred embodiment of the invention, the separator according to the invention has a surface shrinkage at 120° C. of 0.1% to 10%, and more preferably of 0.1% to 5%.

The proportion of comb polymer in the separator according to the invention is preferably 20 wt % to 200 wt %, more preferably 50 wt % to 150 wt %, and in particular 75 wt % to 130 wt %, in each case based upon the weight of the porous substrate.

According to the invention, the separator has a porous substrate. A porous substrate is understood according to the invention to mean a sheet which is suitable as a base material for use as a separator-particularly in batteries, capacitors, fuel cells, electrolyzers, and/or combinations thereof.

Preferably, the porous substrate has a thickness, measured according to test specification DIN EN ISO 9073-2, of 8 μm to 500 μm, more preferably of 10 μm to 500 μm, more preferably of 10 μm to 250 μm, and in particular of 10 μm to 200 μm.

Likewise preferably, the porous substrate has a weight, measured according to test specification ISO 9073-1, of 3 g/$m^2$ to 300 g/$m^2$, more preferably 5 g/$m^2$ to 200 g/$m^2$, more preferably 5 g/$m^2$ to 150 g/$m^2$, and in particular 5 g/$m^2$ to 100 g/$m^2$.

In a further preferred embodiment of the invention, the porous substrate has a porosity of 25% to 90%, more preferably of 35% to 80%, and in particular of 40% to 75%, prior to application of the comb polymer.

Particularly suitable as porous substrates are, according to the invention, microporous membranes such as, preferably, polyester membranes—in particular, polyethylene terephthalate and polybutylene terephthalate membranes-polyolefin membranes—in particular, polypropylene or polyethylene membranes-polyimide membranes, polyurethane membranes, polybenzimidazole membranes, polyetheretherketone membranes, polyethersulfone membranes, polytetrafluoroethylene membranes, polyvinylidene fluoride membranes, polyvinyl chloride membranes, and/or laminates thereof.

Particularly preferred microporous membranes are polyolefin membranes, polyester membranes, polybenzimidazole membranes, polyimide membranes, and/or laminates thereof.

In a preferred embodiment, the microporous membranes have an inorganic coating, preferably based upon aluminum oxide, boehmite, silicon dioxide, zirconium phosphate, titanium dioxide, diamond, graphene, expanded graphite, boron nitride, and/or mixtures thereof.

Particular preference is given to coatings based upon aluminum oxide, silicon dioxide, titanium dioxide, zirconium phosphate, boron nitride, and/or mixtures thereof.

In a further preferred embodiment of the invention, the porous substrate is selected from textile fabrics—in particular, woven fabrics, knitted fabrics, papers, and/or nonwovens. It is advantageous with textile fabrics that they have a low degree of thermal shrinkage and a high degree of mechanical stability. This is advantageous for use in batteries, capacitors, fuel cells, electrolyzers, and/or combinations thereof, since this increases the safety of the same.

Nonwovens are particularly preferred, because they combine a high degree of isotropy of their physical properties with a favorable production.

Nonwovens can be spunbond nonwovens, meltblown nonwovens, wet nonwovens, dry nonwovens, nanofiber nonwovens, and nonwovens spun from solution. In one embodiment, spunbond nonwovens are preferred, because they can be provided with a high degree of mechanical strength through the targeted adjustment of the distribution of the fiber thicknesses. In a further embodiment, meltblown nonwovens are preferred because they can be provided with a low fiber thickness and a very homogeneous distribution with respect to the fiber thicknesses. In a further embodiment, dry nonwovens are preferred because they have a high tensile strength of the fibers. In a particularly preferred embodiment, the textile fabric is a wet nonwoven, since this can be manufactured with a very uniform fiber distribution, a low weight, and a particularly low thickness. A low thickness of the porous nonwoven substrate enables electrochemical energy accumulators and converters with high degrees of energy density and power density.

The nonwoven-particularly in its embodiment as a wet nonwoven—can have staple fibers and/or short-cut fibers. According to the invention, staple fibers, in contrast to filaments which have a theoretically unlimited length, are to be understood as fibers with a limited length of preferably 1 mm to 80 mm, and more preferably of 3 mm to 30 mm. According to the invention, short-cut fibers are to be understood as fibers with a length of preferably 1 mm to 12 mm, and more preferably 3 mm to 6 mm. The mean titer of the fibers can vary as a function of the desired structure of the nonwoven. The use of fibers with a mean titer of 0.06 dtex to 3.3 dtex, preferably of 0.06 dtex to 1.7 dtex, and preferably of 0.06 dtex to 1.0 dtex, has, in particular, proved to be advantageous.

Practical tests have shown that the at least partial use of microfibers having a mean titer of less than 1 dtex, and preferably of 0.06 dtex to 1 dtex, has an advantageous effect on the size and structure of the pore sizes and inner surface, and also on the thickness of the nonwoven. Thereby, proportions of at least 5 wt %, preferably of 5 wt % to 35 wt %, and, in particular, preferably of 5 wt % to 20 wt %, of microfibers, in each case based upon the total amount of fibers in the nonwoven, have proven to be particularly advantageous. Thus, it was found in practical tests that a particularly homogeneous coating can be achieved with the aforementioned parameters.

The fibers can be formed in a wide variety of shapes, e.g., as flat, hollow, round, oval, trilobal, multilobal, bicomponent, and/or island-in-the-sea fibers. According to the invention, the cross-section of the fibers is preferably round.

According to the invention, the fibers can contain a wide variety of fiber polymers—preferably polyacrylonitrile, polyvinyl alcohol, viscose, cellulose, polyamides—in particular, polyamide 6 and polyamide 6.6—polyesters—in particular, polyethylene terephthalate and/or polybutylene terephthalate—copolyesters, polyolefins—in particular, polyethylene and/or polypropylene—and/or mixtures thereof. Polyestersin particular, polyethylene terephthalate and/or polybutylene terephthalate—and/or polyolefins—in particular, polyethylene and/or polypropylene—are preferred.

The use of polyesters has the advantage that they have a high degree of mechanical strength. The advantage of using polyolefins is that, because of their hydrophobic surface, they do not restrict the mobility of hydrophilic lateral chains.

Advantageously, the fibers contain the aforementioned materials in a proportion of more than 50 wt %, preferably more than 90 wt %, and more preferably of 95 wt % to 100 wt %. Very particularly preferably, they consist of the above-mentioned materials, wherein it is possible for the usual impurities and auxiliary agents to be present.

The fibers of the nonwoven may be in the form of matrix fibers and/or binding fibers. Binding fibers within the meaning of the invention are fibers which—for example during the production process of the nonwoven—can form solidification points and/or solidification regions at least at some intersection points of the fibers as a result of heating to a temperature above their melting point and/or softening point. At these intersection points, the binding fibers can form firmly-bonded connections to other fibers and/or to themselves. The use of binding fibers thus makes it possible to construct a framework and to obtain a thermally-solidified nonwoven. Alternatively, the binding fibers can also melt completely and solidify the nonwoven in this way. The binding fibers can be formed as core-sheath fibers, in which the sheath constitutes the binding component, and/or as non-drawn fibers.

Matrix fibers within the meaning of the invention are fibers which, unlike binding fibers, are present in a significantly clearer fiber form. An advantage of the presence of the matrix fibers is that the stability of the fabric as a whole can be increased.

The separator according to the invention can be easily manufactured by a method comprising the following steps:
providing a porous substrate
providing a reaction mixture comprising a polymerization initiator along with
  a) a polymerizable monomer, having a Lewis-acid and/or Lewis-base functionality, and a bi- or polyfunctional monomer and/or
  b) a polymerizable macromonomer having a Lewis-acid and/or Lewis-base functionality
impregnating and/or coating the porous substrate with the reaction mixture
polymerization of the monomers and/or macromonomers to form a comb polymer which contains a polymer main chain and several lateral chains covalently bonded to the polymer main chain, and wherein at least one of the lateral chains has at least one Lewis-acid and/or Lewis-base functionality.

In variant a, the reaction mixture comprises a bi- or polyfunctional monomer. This can lead to crosslinking of the comb polymer formed during the polymerization.

In variant b, for crosslinking the comb polymer, a bi- or polyfunctional monomer can likewise be present in the reaction mixture. However, the macromonomer itself could also have crosslinkable units.

In a preferred embodiment of the invention, the polymerization of the monomers and/or macromonomers and the crosslinking of the comb polymer take place simultaneously.

The crosslinking of the comb polymer can take place via crosslinking units polymerized into the polymer main chain and/or polymer lateral chain, wherein the polymerized crosslinking units can be obtained by copolymerizing bifunctional or polyfunctional monomers during production of the comb polymer.

The preferred types of crosslinking are those described above. Free-radical crosslinks are particularly preferred.

The polymerization of the monomers and/or macromonomers to form the comb polymer preferably takes place in a free-radical and/or ionical manner. Thereby, the polymerization can preferably be initiated thermally and/or in a radiation-induced manner.

A further subject matter of the present invention relates to the use of the separator according to the invention for the separation of electrochemical half-cells in electrochemical energy accumulators and/or converters-preferably in batteries, and particularly in primary or secondary batteries, in capacitors, fuel cells, electrolyzers, and/or combinations thereof.

A further subject matter of the present invention relates to an electrochemical energy accumulator and/or converter-preferably batteries, and particularly primary or secondary batteries, capacitors, fuel cells, electrolyzers, and/or combinations thereof-comprising a separator according to the invention.

Measuring Methods:

Basis Weight:

The basis weight of the separator according to the invention was determined according to test specification ISO 9073-1.

Thickness:

The thickness of the separator according to the invention was measured according to test specification DIN EN ISO 9073-2. The measuring surface is 2 cm$^2$; the measuring pressure 1,000 cN/cm$^2$.

Gurley Measurements:

Based upon ASTM D-726-58, the Gurley values of the separators are determined. The test determines the time required for a particular volume of air (50 cm$^3$) to pass through a standard surface of a material under a slight pressure. The air pressure is given by an inner cylinder having a specific diameter and a standardized weight, free-floating in a common cylinder, partially filled with an oil acting as an air seal. If a determination of the air permeability of the separators according to Gurley is not possible, this means that the separators are so thick that no air permeability can be measured.

Porosity:

This is to be understood within the framework of this description as the following expression: P=(1-FG/(d.& 8)). 100, wherein FG is the basis weight of the porous substrate in kg/m$^2$, d is the thickness in m, and 8 is the density in kg/m$^3$.

Ionic Resistance:

The ionic resistance of the separators according to the invention is determined by impedance spectroscopy.

In organic electrolytes: For this purpose, the samples to be examined are dried at 120° C. in a vacuum and then placed in 1M LiPF$_6$ in propylene carbonate for 5 hours, such that they are completely wetted with electrolyte. These samples are subsequently placed between 2 polished stainless-steel punches, and the impedance is measured from 1 Hz to 100 kHz.

In aqueous electrolytes: For this purpose, the samples to be examined are placed in the aqueous electrolyte (30% KOH for examples in Table 2; 10% sulfuric acid for examples in Table 3) for 5 hours, such that they are completely wetted with electrolyte. These samples are subsequently placed between two polished stainless-steel punches, and the impedance is measured from 1 Hz to 100 kHz.

Electrolyte Absorption:

Electrolyte absorption is determined in accordance with EN 29073-03. With organic electrolytes, LiPF$_6$ is used in propylene carbonate (1 molar); with aqueous electrolytes, 30% KOH.

Sulfide Shuttle:

A polysulfide solution is prepared by dissolving stoichiometric quantities of LI$_2$S and elemental sulfur in DOL/DME (50:50 (vol %)) at 60° C. while stirring. In order to determine the sulfide impermeability of the separators, two glass half-cells are separated by a separator. Pure, transparent DOL/DME (50:50 (vol %)) is added to one cell, and 0.5 M red-brown polysulfide solution in DOL/DME (50:50 (vol %)) is added to the other half-cell. The extent of sulfide permeation through the separators at 23° C. is determined by the color change of the transparent DOL/DME (50:50 (vol %)) after 1 hour, 2 hours, 24 hours, and 48 hours.

Air Permeability Measurements:

The air permeabilities are determined on the basis of DIN EN ISO 9237; the test result is given in dm$^3$/s*m$^2$.

Shrinkage:

For the determination of shrinkage, samples of 100 mm×100 mm are punched out and stored for one hour at 120° C. in a lab dryer made by Mathis. The shrinkage of the samples is then determined.

EXAMPLE 1

A PET wet nonwoven (basis weight: 40 g/m$^2$; thickness 0.1 mm) was coated with a solution consisting of 70 g of a PEG-functionalized dimethacrylate (Mn PEG: 308 g/mol), 8 g of a PEG-diacrylate (Mn PEG: 250 g/mol), 170 g of water, and 2.5 g of a commercially available UV radical initiator and irradiated with UV light for 60 seconds. The resulting coated nonwoven was then washed in a water bath and dried at 100° C. The test was repeated 4 times, and the mean values of thicknesses and weights were determined. A coated nonwoven with a thickness of 0.145 mm and a basis weight of 101.5 g/m$^2$ was obtained.

EXAMPLE 2

A PP wet nonwoven (basis weight: 50 g/m$^2$; thickness 0.1 mm) was coated with a solution consisting of 67.5 g of a PEG-functionalized acrylate (Mn PEG: 480 g/mol), 10 g of a PEG-diacrylate (Mn PEG: 250 g/mol), 166.3 g of water, and 5.1 g of a commercially available UV radical initiator and irradiated with UV light for 60 seconds. The resulting coated nonwoven was then washed in a water bath and dried at 100° C. The test was repeated 4 times, and the mean values of thicknesses and weights were determined. A coated nonwoven with a thickness of 0.11 mm and a basis weight of 89.2 g/m$^2$ was obtained.

EXAMPLE 3

A PP wet nonwoven (basis weight: 50.2 g/m$^2$; thickness 0.103 mm) was coated with a solution consisting of 135 g of a PEG-functionalized acrylate (Mn PEG: 480 g/mol), 25 g of a PEG-diacrylate (Mn PEG: 250 g/mol), 320 g of water, and 5 g of a commercially available UV radical initiator and irradiated with UV light for 45 seconds. The resulting coated nonwoven was then washed in a water bath and dried at 100° C.

A coated nonwoven with a thickness of 0.117 mm and a basis weight of 87.4 g/m$^2$ was obtained.

Comparative Example 1 (Coated with Linear Polymers):

A PET wet nonwoven (weight 85 g/m$^2$, thickness 0.12 mm) is coated with a 50% aqueous dispersion of a polyurethane acrylate and dried at 120° C. The polyurethane acrylate is not a comb polymer having at least one lateral chain with a molecular weight of at least 60 g/mol and/or at least 5 repeat units. Rather, the lateral chains preferably have a molecular weight of 500 to 1,000 g/mol. During drying, thermal crosslinking of the polyurethane acrylate occurs. A coated nonwoven with a thickness of 0.128 mm and a weight of 145 g/m$^2$ was obtained.

Examples 1-3 have no air permeability according to Gurley. This means that no continuous pores are present. The electrical resistance of the separators, measured in 1 M LiPF$_6$ dissolved in propylene carbonate, is very low and of the same order of magnitude as commercial separators. There is no dependence of the electrical conductivity on the pore sizes of the continuous pores. A diffusion of sulfide ions through the separator (in dimethyl ether) could not be detected.

TABLE 1

SEPARATORS FOR ORGANIC ELECTROLYTES.

| | Weight, uncoated [g/m²] | Thickness, uncoated [μm] | Weight, coated [g/m²] | Thickness, coated [μm] | Gurley 50 cm³ [s] | Electrical resistance at 100 kHz [mOhm * cm²/μm] | Sulfide shuttle suppression (DOL/DME) |
|---|---|---|---|---|---|---|---|
| Example 1 (V1) | 40 | 100 | 102 | 145 | Not measurable/airtight | 65 | Yes |
| Example 2 (V2) | 50 | 100 | 89 | 110 | Not measurable/airtight | 120 | Yes |
| Example 3 (V3) | 50 | 100 | 87 | 117 | Not measurable/airtight | 110 | Yes |
| Comparative example 1 | 85 | 120 | 145 | 128 | 850 | 810 | No |
| Uncoated nonwoven | 40 | 110 | — | — | 0 | 60 | No |
| 3-layer PO membrane | 13 | 25 | — | — | 610 | 90 | No |
| 3-layer PO membrane | 11 | 20 | — | — | 520 | 100 | No |
| Al₂O₃-coated PET | 7 | 17 | 30 | 25 | 95.4 | 120 | No |
| nonwoven + Al₂O₃-coated PE membrane | — | — | 22 | 20 | 450 | 110 | No |

EXAMPLE 4-8

PP wet nonwovens (see Table 2) were coated with a solution consisting of 62.5 g of acrylic acid, 6 g of a crosslinker, 125.5 g of water, and 2 g of a commercially available UV radical initiator and irradiated continuously with UV light. The application rate was varied by means of the speed of the applicator roller. The resulting coated nonwovens were then washed in a water bath and dried at 100° C. Coated nonwovens with weights of 77 g/m² to 110 g/m² were obtained (see Table 2).

With these examples, the electrical resistance in 30% KOH of the separators can be adjusted independently of the air permeability, i.e., independently of the pore sizes of the continuous pores. Thus, the electrical conductivity is decoupled from the pore size.

EXAMPLE 9

A PP wet nonwoven (basis weight: 50.2 g/m²; thickness 0.12 mm) was coated with a solution consisting of 12.5 kg of acrylic acid, 600 g of a crosslinker, 6.3 kg of water, and 200 g of a commercially available UV radical initiator and continuously irradiated with UV light. The resulting coated nonwoven was then washed in a water bath and dried at 100° C. A coated nonwoven with a thickness of 0.125 mm and a basis weight of 77 g/m² was obtained.

In Example 8, the electrical resistance, measured in 10% $H_2SO_4$, is lower than that of the commercially available Nafion membrane (see Table 3).

In Example 9, the electrical conductivity, measured in 10% $H_2SO_4$, is greater than that of the commercially available perfluorosulfonic acid membrane (PFSA; see Table 3).

TABLE 2

SEPARATORS FOR AQUEOUS ALKALINE ELECTROLYTES.

| | Weight, uncoated [g/m²] | Thickness, uncoated [μm] | Weight, coated [g/m²] | Thickness, coated [μm] | Airflow (200 Pa) [L/(s * m²)] | KOH absorption [%] | Electrical resistance at 100 kHz [Ωcm²] |
|---|---|---|---|---|---|---|---|
| Example 4 (V4) | 50 | 120 | 77 | 125 | 0.02 | 347 | 0.101 |
| Example 5 (V5) | 67 | 220 | 96 | 228 | 183 | 256 | 0.143 |
| Example 6 (V6) | 67 | 220 | 82 | 220 | 280 | 267 | 0.119 |
| Example 7 (V7) | 67 | 220 | 110 | 225 | 52 | 252 | 0.176 |
| Example 8 (V8) | 67 | 220 | 109 | 232 | 0.06 | 321 | 0.180 |
| 3-layer laminate (nonwoven-membrane-nonwoven) | — | — | 141 | 255 | 0.02 | 216 | 0.330 |

Air permeability according to Gurley could not be measured, due to the complete air impermeability. There is no correlation between the electrical conductivity and the maximum pore size of the separator.

TABLE 3

SEPARATORS FOR AQUEOUS ACIDIC ELECTROLYTES.

| | Weight, uncoated [g/m$^2$] | Thickness, uncoated [μm] | Weight, coated [g/m$^2$] | Thickness, coated [μm] | Airflow (200 Pa) [L/(s * m$^2$)] | Conductivity at 100 kHz Conductivity [mS/cm] | Electrical resistance at 100 kHz [Ωcm$^2$] |
|---|---|---|---|---|---|---|---|
| Example 8 (V8) | 67 | 220 | 109 | 232 | 0.06 | | 1.384 |
| Example 9 (V9) | 50 | 120 | 77 | 125 | 0 | 86 | |
| PFSA membrane | — | — | 107 | 50 | 0 | 59 | |
| Nafion NM-117 | 360 | 183 | | | 0 | | 0.608 |

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A separator for an electrochemical energy device, comprising:
   a porous substrate with a comb polymer,
   the comb polymer containing several lateral chains that are covalently bonded to the polymer main chain,
   wherein at least one of the lateral chains has at least one Lewis-acid or Lewis-base functionality,
   wherein the separator has a Gurley value of at least 500 s or wherein the air permeability of the separator cannot be measured.

2. The separator of claim 1, wherein an ion conductivity of the separator is decoupled from an air permeability of the separator, such that the ion conductivity of the separator can be adjusted independently of the air permeability of the separator.

3. The separator of claim 1, wherein the polymer main chain has polymerized monomers selected from a group consisting of: acrylates, methacrylates, acrylic acids, methacrylic acids, acrylamides, methacrylamides, vinylamides, vinylpyridines, N-vinylimidazoles, N-vinyl-2-methylimidazoles, vinyl halides, styrenes, 2-methylstyrenes, 4-methylstyrenes, 2-(n-butyl) styrenes, 4-(n-butyl) styrenes, 4-(n-decyl) styrenes, N,N-diallylamines, N,N-diallyl-N-alkylamines, vinyl- and allyl-substituted nitrogen heterocycles, vinyl ethers, vinylsulfonic acids, allylsulfonic acids, vinylphosphonic acids, styrene sulfonic acids, acrylonitriles and methacrylnitriles, and mixtures thereof.

4. The separator of claim 1, wherein the lateral chain has polymerized monomers selected from a group consisting of: acrylates, methacrylates, acrylamides, methacrylamides, vinylamides, vinylpyridines, N-vinylimidazoles, N-vinyl-2-methylimidazoles, vinyl halides, styrenes, 2-methylstyrenes, 4-methylstyrenes, 2-(n-butyl) styrenes, 4-(n-butyl) styrenes, 4-(n-decyl) styrenes, N,N-diallylamines, N,N-diallyl-N-alkylamines, vinyl- and allyl-substituted nitrogen heterocycles, vinyl ethers, acrylonitriles and methacrylnitriles, acrylic acids, methacrylic acids, vinylsulfonic acids, allylsulfonic acids, vinylphosphonic acids, styrene sulfonic acids, and mixtures thereof.

5. The separator of claim 1, wherein at least one lateral chain is formed from polymerized macromonomers, wherein each macromonomer comprises an oligomer or polymer containing at least one polymerizable group.

6. The separator of claim 1, wherein the comb polymer is at least partially crosslinked.

7. The separator of claim 1, further comprising:
   bifunctional or polyfunctional monomers selected from a group consisting of: diacrylates, dimethyl acrylates, triacrylates, trimethacrylates, tetraacrylates, tetramethacrylates, pentaacrylates, pentamethacrylates, hexaacrylates, hexamethacrylates, diacrylamides, dimethacrylamides, triacrylamides, trimethacrylamides, tetraacrylamides, tetramethacrylamides, pentaacrylamides, pentamethacrylamides, hexaacrylamides, hexamethacrylamides, divinyl ethers, divinyl benzenes, 3,7-dimethyl-1,6-octadien-3-ol, and mixtures thereof, wherein the bifunctional or polyfunctional monomers are copolymerized to form polymerized crosslinking units, wherein the polymerized crosslinking units crosslink the comb polymer by: covalently bonding the polymer main chain to another polymer main chain, covalently bonding the polymer main chain to one of the several lateral chains, covalently bonding one of the several lateral chains to another of the several lateral chains, or a combination thereof.

8. The separator of claim 1, wherein a proportion of comb polymer, based upon a weight of the porous substrate, is 20 wt % to 200 wt %.

9. The separator of claim 1, wherein the porous substrate is selected from a group consisting of: microporous membrane, textile fabrics, woven fabrics, knitted fabrics, papers, and nonwovens.

10. The separator of claim 1, wherein the separator has at least one of a thickness of 10 μm to 2,000 μm or a weight of 6 g/m² to 400 g/m².

11. The separator of claim 1, wherein at least one of the Lewis-acid or Lewis-base functionalities are selected from a group consisting of: primary amino groups, secondary amino groups, tertiary amino groups, quaternary amino groups, imino, enamino, lactam, nitrate, nitrite, carboxyl, carboxylate ketyl, aldehyde, lactone, carbonate, sulfonyl, sulfonate, sulfide, sulfite, sulfate, sulfonamide, thioether, phosphonyl, phosphonate, phosphate, phosphoric acid ester, ether, hydroxyl, hydroxide, halide, coordinately-bonded metal ion, transition metal ion, thiocyanate, and cyanide groups.

12. The separator of claim 1, wherein the lateral chains have a molecular weight of 220 g/mol to 5,000 g/mol.

13. The separator of claim 1, wherein the electrochemical energy device is one of an accumulator or a converter.

14. A method of producing the separator of claim 1, comprising:
providing the porous substrate;
providing a reaction mixture comprising a polymerization initiator and at least one of
a polymerizable monomer having the at least one of Lewis-acid or Lewis-base functionality and a bi- or polyfunctional monomer, or
a polymerizable macromonomer having the at least one of Lewis-acid or Lewis-base functionality;
impregnating or coating the porous substrate with the reaction mixture; and
polymerizing at least one of the monomers or macromonomers to form the comb polymer, which contains the polymer main chain and several lateral chains covalently bonded to the polymer main chain,
wherein at least one of the lateral chains has the at least one of Lewis-acid or Lewis-base functionality.

15. An electrochemical energy device, comprising a separator according to claim 1.

16. The electrochemical energy device of claim 15, wherein the electrochemical energy device is one of an accumulator or a converter.

17. The electrochemical energy device wherein the accumulator or converter includes at least one of a battery, a capacitor, a fuel cell or an electrolyzer.

* * * * *